United States Patent [19]

Steiner

[11] Patent Number: 5,495,332
[45] Date of Patent: Feb. 27, 1996

[54] ARRANGEMENT FOR SENSING THE WAVELENGTH SHIFT OF LIGHT FROM A POLYCHROMATIC LIGHT SOURCE

[75] Inventor: Ivan B. Steiner, Ridgewood, N.J.

[73] Assignee: AlliedSignal Inc., Morris Township, N.J.

[21] Appl. No.: 298,504

[22] Filed: Aug. 30, 1994

[51] Int. Cl.$^6$ .................................................. G01J 3/18
[52] U.S. Cl. ................................. 356/328; 250/339.07
[58] Field of Search .................................. 356/326, 328; 372/32; 250/339.07

[56] References Cited

U.S. PATENT DOCUMENTS

| | | | |
|---|---|---|---|
| 4,758,090 | 7/1988 | Schuma | 372/32 |
| 4,829,533 | 5/1989 | Hallberg et al. | 372/32 |
| 5,305,330 | 4/1994 | Rieder et al. | 372/32 |

*Primary Examiner*—F. L. Evans

[57] ABSTRACT

An arrangement for sensing the wavelength shift of light from a polychromatic light source features a tilted concave holographic reflection grating that diffracts light from the light source and disperses the light across the focal plane of the arrangement. A pair of matched detectors disposed behind the focal plane senses the light transmitted by a variable neutral density filter at the focal plane. The difference in output signal electrical currents generated by the detectors is a measurement of the shift in polychromatic wavelength distribution.

16 Claims, 1 Drawing Sheet

ARRANGEMENT FOR SENSING THE WAVELENGTH SHIFT OF LIGHT FROM A POLYCHROMATIC LIGHT SOURCE

BACKGROUND OF THE INVENTION

This invention relates generally to a wavelength monitor and particularly to a wavelength monitor arrangement which senses the wavelength shift of light from a polychromatic light source.

The wavelength distribution of polychromatic light from a light source such as used, for example, in fiber optics angular rate sensors changes scale factor in a relationship proportional to an interferometric sagnac phase shift signal and angular rate. In order to maintain accurate angular rate measurement, an accurate open loop measurement of the shift in wavelength distribution relative to a known calibration set point is required. In a closed loop configuration, a wavelength difference signal is required to drive a deviant polychromatic wavelength distribution back to the calibration set point.

U.S. Pat. No. 4,588,296 issued on May 13, 1986 to Kevin Killian and Richard Schuma and assigned to the assignee of the present invention utilizes a flat reflective diffraction grating arranged with a lens. The present invention uses a concave holographic reflection grating. Further, the aforementioned patent uses a mask configured in an "X" pattern with an alternating set of four transmitting and opaque areas to provide the required transmittance weighting factor at each wavelength. The present invention uses a neutral density filter in the focal plane of the device for this purpose.

The applicant herein is also aware of another device that uses a lens arranged with a flat reflection grating to disperse the polychromatic light across the focal plane of the device. However, instead of utilizing a tilted front surface diffraction grating as does the invention of U.S. Pat. No. 4,588,296, the reflection grating is on the rear surface of a prism element. Also, instead of using a bi-cell detector as does the present invention, a linear array detector is utilized.

SUMMARY OF THE INVENTION

This invention contemplates an arrangement for sensing the wavelength shift of light from a polychromatic light source featuring a single spherical, concave, tilted holographic reflection grating which receives the polychromatic light via an optical fiber input and disperses an image chromatically across the focal plane of the arrangement. Two adjacent detectors are disposed behind the focal plane and are aligned such that the boundary line between the detectors is parallel to the cross-dispersion direction of the light and is located at the initial diffracted interferometric wavelength image. A variable neutral density filter in the focal plane provides the required transmittance weighting factor at each wavelength to cause initially identical output signals to be generated by the two detectors. A shift in the light source wavelength distribution from a calibration set point generates a difference signal in the detector outputs which provides a measure of the interferometric wavelength shift.

BRIEF DESCRIPTION OF THE DRAWING

The single FIGURE in the drawing is a diagrammatic representation illustrating the invention.

DETAILED DESCRIPTION OF THE INVENTION

Figure 1:
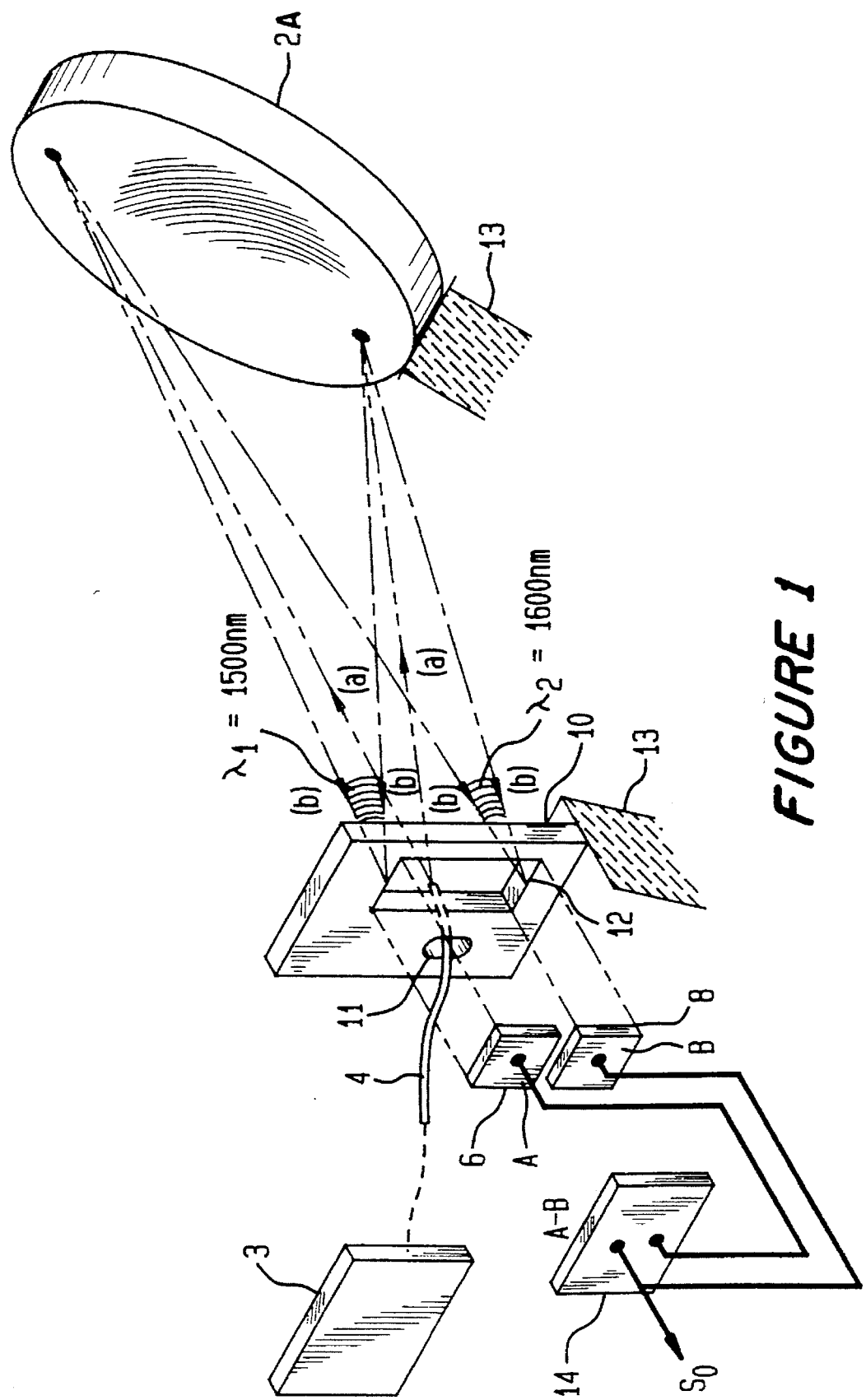

A single spherical, concave, tilted holographic reflection grating is designated by the numeral 2A and is supported by a support structure 13. Reflection grating 2A receives polychromatic light transmitted from a light source 3 through an optical fiber 4 as may be the case, for example, in a fiber optic angular rate sensor and as indicated by arrows (a) in the FIGURE. Reflection grating 2A disperses an image chromatically across the focal plane of the arrangement as indicated by arrows (b) in the FIGURE.

Two adjacent matched detectors 6 and 8 are disposed behind the focal plane and are aligned so that the boundary line between the detectors is parallel to the cross-dispersion direction of the light and is located at the initial diffracted interferometric wavelength image.

The interferometric wavelength ($\lambda_{int}$) is defined as the equivalent monochromatic wavelength that represents the polychromatic distribution of light from light source 3. The average frequency ($\bar{v}$) of this distribution is given by:

$$\bar{v} = \frac{\int_0^\infty G^2(v)dv}{\int_0^\infty G^2(v)dv} \; ; \tag{1}$$

where $G^2(v)$ is the light source power density spectrum ($P(v)$); $\lambda_{int}=C/\bar{v}$; and C is the speed of light. Thus:

$$c/\lambda_{int} = \bar{v} = \frac{\int_0^\infty vP(v)dv}{\int_0^\infty P(v)dv} \; . \tag{2}$$

In regard to the above, reference is made to the text *Principles of Optics* by Max Born and Emil Wolf, published by Pergaman Press, 6th edition, reprinted 1987, page 540.

A substrate 10 supported by support structure 13 is disposed in the focal plane and includes an aperture 11 for optical fiber 4 which is maintained in a critical position by attachment to substrate 10 and a variable neutral density filter 12 which provides the required transmittance weighting factor at each wavelength such as $\lambda_1$ and $\lambda_2$ to cause identical electrical output signals (A) and (B) to be generated by detectors 6 and 8, respectively. A shift in the source wavelength distribution from its calibration set point generates a difference in the outputs of detectors 6 and 8, and which difference (A–B) is provided as an electrical output signal ($S_0$) by a difference means 14. The output signal is a measure of the interferometric wavelength shift. Output signal ($S_0$) is an accurate open loop measurement of a shift in wavelength relative to the calibration set point and can be used in a closed loop configuration to drive a deviant polychromatic wavelength distribution back to the calibration set point.

The determination of the aforenoted transmittance weighting factors is in accordance with the following:

$$v = \frac{\int_0^\infty vP(v)dv}{\int_0^\infty P(v)dv} \; ; \tag{3}$$

-continued $$\int_0^\infty \overline{v}P(v)dv = \int_0^\infty vPvdv;$$

$$\int_0^{\overline{v}} \overline{v}P(v)dv + \int_{\overline{v}}^\infty vP(vdv) =$$

$$\int_0^{\overline{v}} vP(v)dv + \int_{\overline{v}}^\infty \overline{v}Pvdv;$$

and $$\int_0^{\overline{v}} (\overline{v}-v)P(v)dv = \int_0^\infty (v-\overline{v})P(v)dv. \quad (4)$$

The left side of equation 4 is proportional to the power on detector 6 and the right side of the equation is proportional to detector 8. The proportionality constant is K and the required transmittance factors (τ) are:

$\tau_6(v) = K(\overline{v}-v)$, for detector 6 when $\overline{v} > v$; and $\tau_8(v) = K(\overline{v}-v)$, for detector 8 when $\overline{v} > v$.

An expression for $v_6$ and $v_8$ in terms of wavelength is achieved by substituting $C/\lambda_{int}$ for $\overline{v}$ and $C/\lambda$ for $v$:

$\tau_6(\lambda) = K \cdot C(1/\lambda_{int} - 1/\lambda)$, when $\lambda > \lambda_{int}$ and $\tau_8(\lambda) = (k \cdot C(1/\lambda - 1/\lambda_{int})$, when $\lambda_{int} > \lambda$.

It will be noted that in an open loop configuration, the position of the interferometric wavelength is tracked dynamically, and the shift in this position is converted to a wavelength shift. In a closed loop configuration, the shift in the weighted signal differences is used to vary any source parameter that changes wavelength to drive the weighted signal differences to zero, thus maintaining the calibration set-point.

The metrically critical components of the arrangement, i.e. reflection grating 2A, support structure 13 and substrate 10 are fabricated of fused silica. This homogeneous fabrication, coupled with the low coefficient of thermal expansion of fused silica, makes the arrangement highly insensitive to changes in soak temperature and thermal gradients. Owing to the temperature coefficient of refractive eliminates thermally induced changes in light distribution and position of focal plane images so as to enhance the invention.

The use of a single spherical, concave, tilted holographic reflection grating as described, instead of a lens coupled with a grating as in the prior art simplifies the arrangement by reducing it to a single optical element. The potential for a more compact design is increased and alignment is enhanced since fewer components are involved. Further, stray light is reduced as is the potential for image ghosts, as will now be appreciated by those skilled in the art.

Grating 2A is designed to elongate the focal plane spectral images in the cross-dispersion of the light, thus homogenizing image structure and thereby improving the accuracy of variable neutral density filter 12 in providing the desired transmittance weighting factor at each spectral image. In this regard, it is noted that in the preferred embodiment of the invention, a variable neutral density filter comprising a variable half-tone pattern is used. The half-tone pattern digitizes the transmittance in metrically accurate areas of fine resolution limited only by the size of the half-tone dots.

It will be appreciated that the all-reflective design contemplated, and the use of fused silica, renders the arrangement radiation-hard.

Variable neutral density filter 12 is of the type having a particular coating which is simultaneously opaque and of low reflectivity for inhibiting image ghosts and stray light due to image back reflectance. A coating having these properties has been developed for a spectral range between 1500 nm and 1600 nm.

The configuration of grating 2A is a "near Littrow configuration" which minimizes aberrations. Nearness to the favored Littrow configuration is maximized by allowing grating 2A to place the holographic construction points outside the dispersion plane.

The spherical radius of curvature of grating 2A is selected to make the focal plane tilt normal to the littrow optical axis, which renders the arrangement insensitive to defocus errors. If the focal plane is not normal to the spectral line images in the dispersion direction, then a defocus error appears as a wavelength shift owing to a resulting lateral shift in the direction of dispersion. Thus, the robustness of the arrangement is enhanced by virtue of its inherent insensitivity to defocus errors.

The optical configuration has elongated spectral line images in the cross-dispersion direction to homogenize the image structure thus reducing the error caused by the granularity of the halftone dots of filter 12. In addition, the parallelism of the elongated spectral line images relative to the cross-dispersion direction is maximized by the holographic construction point geometry in order to maximize spectral resolution and thus increase the accuracy of the spectral weighting function produced by filter 12.

In summary, the disclosed arrangement for sensing the wavelength shift of light from a polychromatic light source, which is in effect a wavelength monitor, incorporates a spherical, concave, tilted holographic reflection grating that diffracts light from the light source and disperses the light across the focal plane of the arrangement. A pair of matched detectors disposed behind the focal plane senses the light transmitted by a variable neutral density filter at the focal plane. The difference (initially zero) in output signal currents generated by the two detectors provides a measure of the shift in polychromatic wavelength distribution for use in open or closed loop configurations as aforenoted.

With the above description of the invention in mind, reference is made to the claims appended hereto for a definition of the scope of the invention.

What is claimed is:

1. An arrangement for sensing the wavelength shift of light from a polychromatic light source, comprising:

a spherical, concave, tilted holographic reflection grating supported by supporting structure and receiving light from the polychromatic light source, said reflection grating dispersing an image chromatically across the focal plane of the arrangement;

a pair of adjacent detectors disposed behind the focal plane and aligned so that the boundary between the detectors is parallel to the cross-dispersion direction of the light and is located at an initial diffracted effective interferometric wavelength image;

a variable neutral density filter in the focal plane for providing a transmittance weighting factor at the initial diffracted effective interferometer wavelength so that each of the pair of detectors initially generates identical output signals; and a shift in the light source wavelength distribution from a calibration set point causing the detectors to generate different output signals, with the difference between the output signals being commensurate with an interferometric wavelength shift.

2. The arrangement as described by claim 1, including:

a substrate supported by the supporting structure disposed in the focal plane, said substrate having an aperture through which light from the polychromatic light source is directed, and supporting the variable neutral density filter; and said substrate supporting the light source which extends through the aperture for preserving a critical location of the light source with respect to the filter and the grating.

3. The arrangement as described by claim 2, wherein:

the reflection grating, the supporting structure and the substrate are of a material having a low coefficient of thermal expansion, whereby the arrangement is insensitive to changes in soak temperature and thermal gradients.

4. The arrangement as described by claim 3, wherein:

the material of the reflection grating and the substrate is fused silica.

5. The arrangement as described by claim 1, wherein:

the reflection grating is configured to elongate focal plane spectral images in the cross-dispersion of the light for homogenizing image structure which improves the accuracy of the variable neutral density filter for providing a desired transmittance weighting factor.

6. The arrangement as described by claim 1, wherein:

the variable neutral density filter has a variable half-tone pattern which digitizes transmittance through the filter in metrically accurate areas of fine resolution limited only by the size of the half-tone dots.

7. The arrangement as described by claim 1, wherein:

the variable neutral density filter has a coating which is simultaneously opaque and of low reflectivity for inhibiting image ghosts and stray light due to image back reflectance, and is for a predetermined spectral range.

8. The arrangement as described by claim 7, wherein:

the predetermined spectral range is between approximately 1500 nm and 1600 nm.

9. An arrangement for sensing the wavelength shift of light from a polychromatic light source, comprising:

a spherical concave, tilted holographic grating that diffracts light from the light source and disperses the light across the focal plane of the arrangement;

a variable neutral density filter disposed in the focal plane for transmitting the dispersed light;

a pair of matched detectors disposed behind the focal plane for sensing the transmitted light and for providing corresponding signals; and means responsive to the signals from the detectors for providing an output signal commensurate with a shift in polychromatic wavelength distribution.

10. The arrangement as described by claim 9, including:

a substrate supported by a support structure disposed in the focal plane, said substrate having an aperture through which light from the polychromatic light source is directed, and supporting the variable neutral density filter; and said substrate supporting the light source which extends through the aperture for preserving a critical location of the light source with respect to the filter and the grating.

11. The arrangement as described by claim 9, wherein:

the reflection grating, the support structure and the substrate are of a material having a low coefficient of thermal expansion, whereby the arrangement is insensitive to changes in soak temperature and thermal gradients.

12. The arrangement as described by claim 11, wherein:

the material of the reflection grating and the substrate is fused silica.

13. The arrangement as described by claim 9, wherein:

the reflection grating is configured to elongate focal plane spectral images in the cross-dispersion of the light for homogenizing image structure which improves the accuracy of the variable neutral density filter for providing a desired transmittance weighting factor.

14. The arrangement as described by claim 9, wherein:

the variable neutral density filter has a variable half-tone pattern which digitizes transmittance through the filter in metrically accurate areas of fine resolution limited only by the size of the half-tone dots.

15. The arrangement as described by claim 9, wherein:

the variable neutral density filter has a coating which is simultaneously opaque and of low reflectivity for inhibiting image ghosts and stray light due to image back reflectance and is for a predetermined spectral range.

16. The arrangement as described by claim 15, wherein:

the predetermined spectral range is between approximately 1500 nm and 1600 nm.

* * * * *

UNITED STATES PATENT AND TRADEMARK OFFICE
CERTIFICATE OF CORRECTION

PATENT NO.    : 5,495,332
DATED         : February 27, 1996
INVENTOR(S)   : Ivan B. Steiner It is certified that error appears in the above-identified patent and that said Letters Patent is hereby corrected as shown below:

Column 2,
Lines 22-28, 31-36 and line 61 to Column 3, line 16, change Equations 1, 2, 3, and 4 as set forth on the attached sheet.

Column 3,
Line 18, change "6" to -- 8 --.
Line 19, change "8" to -- 6 --.
Line 21, change to read -- $\tau_8(\upsilon)=K(\overline{v}-\upsilon)$, detector 8 when $\overline{v}-\upsilon$ --; and
Line 22, change to read -- $\tau_6(\upsilon)=K(\upsilon-\overline{v})$, detector 6 when $\upsilon - \overline{\upsilon}$ --.

$$\overline{v} = \frac{\int_0^\infty v \cdot G^2(v) \cdot dv}{\int_0^\infty G^2(v) \cdot dv} \qquad (1)$$

$$\frac{c}{\gamma} = \overline{v} = \frac{\int_0^\infty v \cdot P(v) \cdot dv}{\int_0^\infty P(v) \cdot dv} \qquad (2)$$

$$\overline{v} = \frac{\int_0^\infty v \cdot P(v) \cdot dv}{\int_0^\infty P(v) \cdot dv} \qquad (3)$$

$$\int_0^\infty \overline{v} \cdot P(v) \cdot dv = \int_0^\infty v \cdot P(v) \cdot dv$$

$$\int_0^{\overline{v}} \overline{v} \cdot P(v) \cdot dv + \int_{\overline{v}}^\infty \overline{v} \cdot P(v) \cdot dv = \int_0^{\overline{v}} v \cdot P(v) \cdot dv + \int_{\overline{v}}^\infty v \cdot P(v) \cdot dv$$

$$\int_0^{\overline{v}} (\overline{v}-v) \cdot P(v) \cdot dv = \int_{\overline{v}}^\infty (v-\overline{v}) \cdot P(v) \cdot dv \qquad (4)$$

UNITED STATES PATENT AND TRADEMARK OFFICE
CERTIFICATE OF CORRECTION

PATENT NO. : 5,495,332
DATED : February 27, 1996
INVENTOR(S) : Ivan B. Steiner

It is certified that error appears in the above-identified patent and that said Letters Patent is hereby corrected as shown below:

Column 3 (con't),
Line 23, change "$v_6$ and $v_8$" to -- $\tau_6$ and $\tau_8$ --.
Line 25, change to read -- $\tau_8(\lambda)=K \cdot C(1 / \lambda_{int} - 1 / \lambda)$, when $\lambda > \lambda_{int}$ and --
Line 26, change to read -- $\tau_8(\lambda)=K \cdot C(1 / \lambda - 1 / \lambda_{int})$, when $\lambda_{int} > \lambda$. --
Line 41, after "refractive" insert -- index of lens materials, the absence of lens elements --.

Signed and Sealed this

Tenth Day of September, 2002

*Attest:*

*Attesting Officer*

JAMES E. ROGAN
*Director of the United States Patent and Trademark Office*